United States Patent
Jeong et al.

(10) Patent No.: US 12,267,639 B2
(45) Date of Patent: Apr. 1, 2025

(54) ACTIVE SOUND DEVICE UTILIZING AUDIO RECOGNITION

(71) Applicant: Cochl Inc, Dover, DE (US)

(72) Inventors: Ilyoung Jeong, Seoul (KR); Hyungui Lim, Seoul (KR); Yoonchang Han, Seoul (KR); Subin Lee, Seoul (KR); Jeongsoo Park, Yongin-si (KR); Donmoon Lee, Suwon-si (KR)

(73) Assignee: COCHL, INC., Dover, DE (US)

( * ) Notice: Subject to any disclaimer, the term of this patent is extended or adjusted under 35 U.S.C. 154(b) by 210 days.

(21) Appl. No.: 17/928,737

(22) PCT Filed: May 18, 2021

(86) PCT No.: PCT/KR2021/006245
§ 371 (c)(1),
(2) Date: Nov. 30, 2022

(87) PCT Pub. No.: WO2021/246686
PCT Pub. Date: Dec. 9, 2021

(65) Prior Publication Data
US 2023/0232146 A1    Jul. 20, 2023

(30) Foreign Application Priority Data
Jun. 3, 2020  (KR) .................. 10-2020-0067150

(51) Int. Cl.
*H04R 1/10* (2006.01)
(52) U.S. Cl.
CPC ......... *H04R 1/1041* (2013.01); *H04R 1/1083* (2013.01); *H04R 2430/01* (2013.01)

(58) Field of Classification Search
None
See application file for complete search history.

(56) References Cited

U.S. PATENT DOCUMENTS

| | | | |
|---|---|---|---|
| 2015/0195641 A1 | 7/2015 | Di Censo et al. | |
| 2018/0249250 A1* | 8/2018 | Pate | G06F 3/165 |
| 2018/0336000 A1 | 11/2018 | Vaughn et al. | |

FOREIGN PATENT DOCUMENTS

| | | |
|---|---|---|
| KR | 10-1595964 B1 | 2/2016 |
| KR | 10-1729189 B1 | 4/2017 |
| KR | 10-1808190 B1 | 12/2017 |
| KR | 10-2020-0045311 A | 5/2020 |
| KR | 10-2243044 B1 | 4/2021 |
| WO | 2011030422 A1 | 3/2011 |
| WO | 2019030811 A1 | 2/2019 |

* cited by examiner

*Primary Examiner* — Kenny H Truong
(74) *Attorney, Agent, or Firm* — NKL Law; Jae Youn Kim

(57) ABSTRACT

The present invention relates to an active sound device utilizing audio recognition, the device comprising a data input unit for inputting audio data from an external terminal, an output unit for outputting the inputted audio data, an audio detection unit for detecting an audio signal generated from outside, a determination unit for determining the audio signal detected by the audio detection unit, and a control unit for, on the basis of information determined by the determination unit, controlling the output of the audio data inputted from the data input unit.

10 Claims, 4 Drawing Sheets

ABSTRACT

ACTIVE SOUND DEVICE UTILIZING AUDIO RECOGNITION

TECHNICAL FIELD

The present invention relates to active audio equipment employing audio recognition. Specifically, the present invention relates to audio equipment capable of actively adjusting audio through audio recognition on the basis of an artificial intelligence algorithm.

BACKGROUND ART

Conventional earphones and headphones have a problem that external noise interferes with a user's sense of hearing while the user is hearing audio. To solve this problem, the user may control the earphones by manually turning on or off volume control and noise cancelling functions. However, the conventional volume control and noise cancelling functions are troublesome in that they should be manually adjusted when needed by the user depending on the situation. Also, when the user intentionally sets the noise cancelling function, the user may be unaware of a dangerous situation, which is problematic. Accordingly, to solve these problems, the present invention proposes active audio equipment employing recognition of externally generated audio on the basis of an artificial intelligence algorithm.

PRIOR ART DOCUMENT

Patent Document (Patent document 1) Korean Patent 10-1357935 (filed on Jan. 24, 2014).

DISCLOSURE

Technical Problem

The present invention is directed to providing active audio equipment based on an artificial intelligence algorithm.

The present invention is also directed to providing active audio equipment that recognizes surroundings and automatically turns on or off an audio adjustment or noise cancelling function.

The present invention is also directed to providing active audio equipment that automatically stops a noise cancelling function when a danger signal is generated.

Technical Solution

One aspect of the present invention provides active audio equipment including an ear cap, at least a portion of which is inserted into a user's ear, a data input unit to which audio data is input from an external terminal, an output unit configured to output the input audio data, an audio detection unit configured to detect an externally generated audio signal, a determination unit configured to determine a class and level of the audio signal by analyzing the audio signal detected by the audio detection unit, and a control unit configured to control output of the audio data input from the data input unit on the basis of information determined by the determination unit.

Advantageous Effects

According to the present invention, it is possible to provide audio equipment capable of turning on or off active audio adjustment or noise cancelling based on an artificial intelligence algorithm by determining a pattern of a user and a type and level of external noise.

Finally, it is possible to control audio or a noise cancelling function without a user's manual operation, and a trained artificial intelligence algorithm can automatically adjust audio in accordance with surroundings or the like.

BEST MODE OF THE INVENTION

Figure 1:
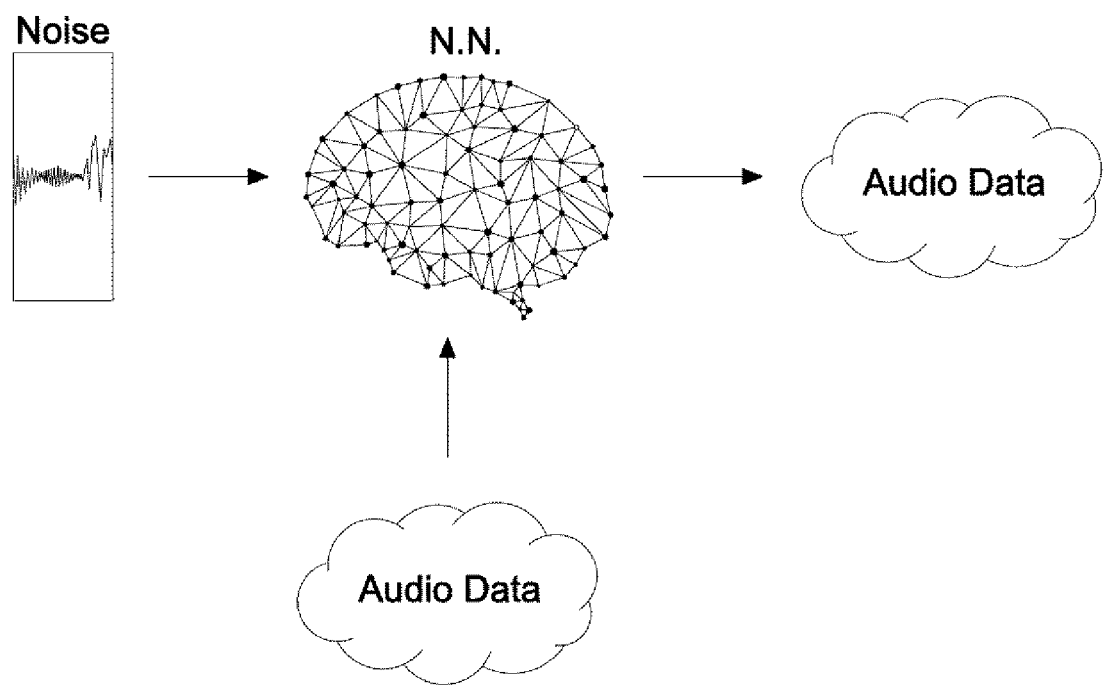
FIG. 1 is a schematic diagram of an audio equipment system according to an embodiment of the present invention.

Active audio equipment includes:
an ear cap (10) at least a portion of which is inserted into a user's ear;
a data input unit (120) to which audio data is input from an external terminal;
an output unit (110) configured to output the input audio data;
an audio detection unit (130) configured to detect an externally generated audio signal;
a determination unit (140) configured to determine at least one of a class and volume of the audio signal by analyzing the audio signal detected by the audio detection unit; and
a control unit (160) configured to control output of the audio data input from the data input unit (120) on the basis of information determined by the determination unit (140).

Modes of the Invention

Hereinafter, embodiments of the present invention will be described in detail with reference to the accompanying drawings so that those of ordinary skill in the art can easily implement the present invention. However, the present invention can be implemented in various different forms and is not limited to the drawings and embodiments disclosed below. To clearly describe the present invention, in the drawings, parts unrelated to the present invention will be omitted, and like reference numerals refer to like components.

Objectives and effects of the present invention can be naturally understood or will become apparent from the following description. A detailed description of the present invention will be omitted when determined to unnecessarily obscure the gist of the present invention. Therefore, objectives and effects of the present invention are not limited to the following description.

The present invention will be described in detail below with reference to the accompanying drawings.

FIG. 1 is a schematic diagram of an audio equipment system according to an embodiment of the present invention.

An embodiment of the present invention will be briefly described with reference to FIG. 1. The present invention relates to audio equipment, such as an earphone, a headset, etc., that outputs audio data input from an external terminal, that is, audio equipment in which an artificial intelligence algorithm of a determination unit 140 makes a judgment about an audio signal including externally generated noise and actively adjusts a class, volume, etc. of the audio signal audible to a user.

Figure 2:
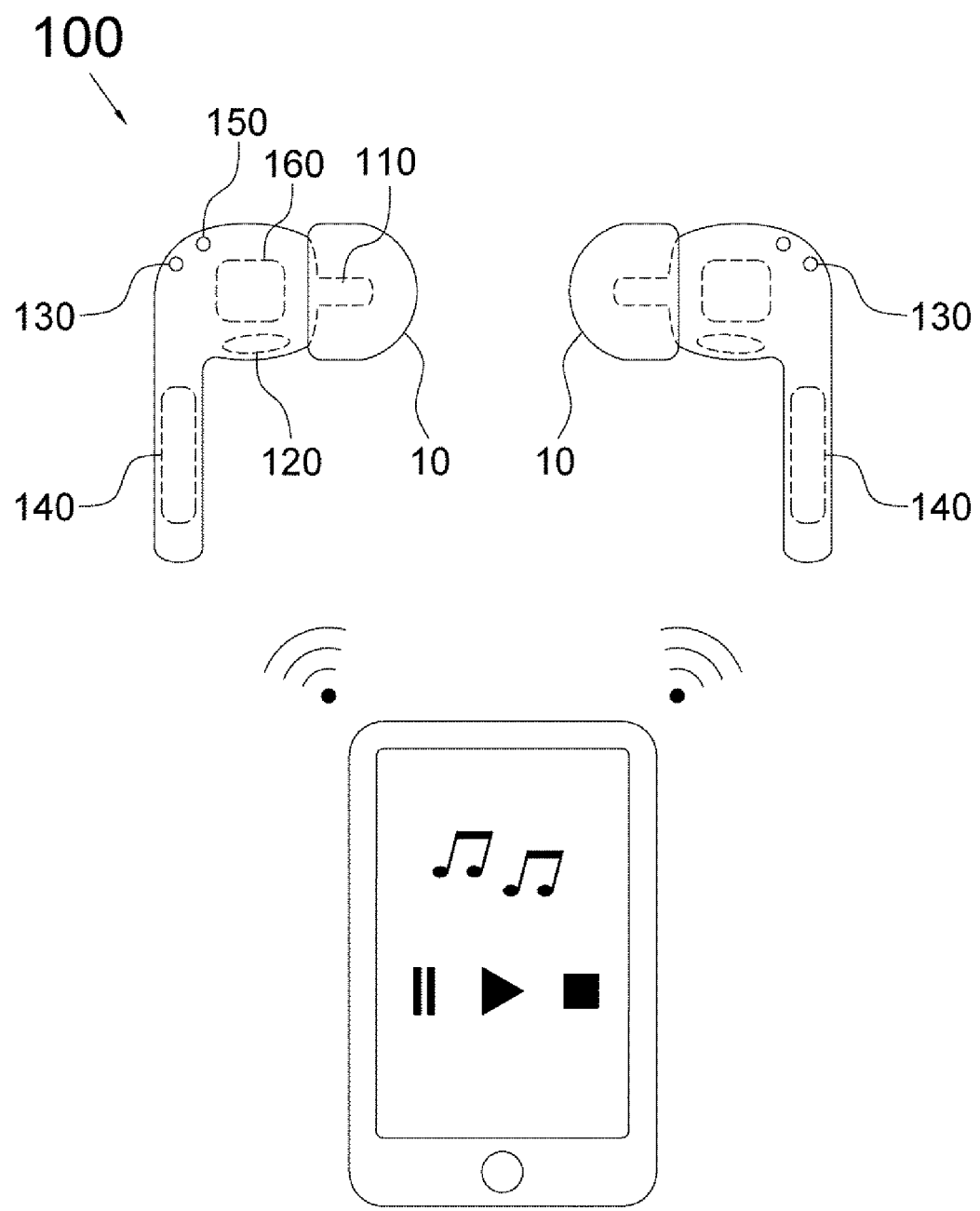
FIG. 2 is a diagram of audio equipment according to an embodiment of the present invention.

The audio equipment will be described in further detail below in accordance with each element with reference to FIGS. 2 and 3. FIG. 2 is a diagram of audio equipment according to an embodiment of the present invention, and FIG. 3 is a block diagram of audio equipment according to an embodiment of the present invention.

Figure 3:
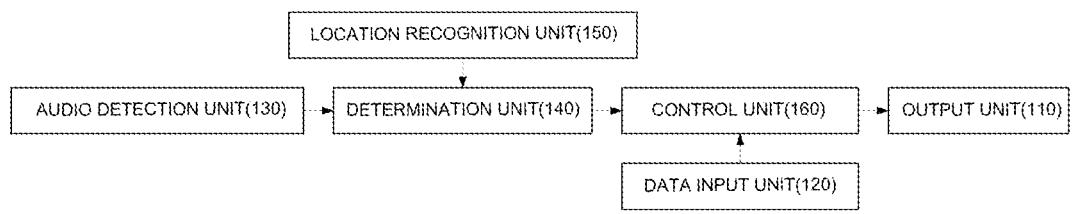
FIG. 3 is a block diagram of audio equipment according to an embodiment of the present invention.

Referring to FIGS. 2 and 3, according to the embodiment, the present invention may include an ear cap 10, an output unit 110, a data input unit 120, an audio detection unit 130, a determination unit 140, a location recognition unit 150, and a control unit 160.

First, the ear cap 10 is an element at least a portion of which is inserted into a user's ear to guide audio data output through the output unit 110 into the user's ear. This may be any one of insertion units of various forms of conventional earphones. The ear cap 10 is not necessarily inserted into the user's ear but may come into contact with the user's auricle in the form of a headset.

The output unit 110 is an element that outputs input audio data, and the data input unit 120 is an element to which the audio data is input from an external terminal. Specifically, the output unit 110 is an element that outputs audio data audible to the user's ear, and the user may finally hear the audio information output from the output unit 110. The data input unit 120 is an element to which the audio data that the user wants to output through the output unit 110 is input and may be any one of electronic devices, such as a portable phone, a laptop computer, an MP3 player, a desktop computer, etc., that may provide audio data. In other words, the external terminal which may input the audio data that the user wants to hear may be any electronic device and may be any one of devices that may transmit audio data to the user's wired or wireless earphone, Bluetooth speaker, wearable device equipped with a speaker, etc. through wired or wireless communication.

The active audio equipment of the present invention may be any one of the user's wired or wireless earphone, headset, etc., and for convenience of description, an embodiment will be described on the basis of a wireless earphone.

The audio detection unit 130 is an element that detects an externally generated audio signal. Specifically, the audio detection unit 130 may detect an audio signal generated by sound other than sound of the output unit 110 that is directly transmitted through the user's sense of hearing. Specifically, the audio detection unit 130 according to the embodiment may detect an audio signal through a microphone formed outside the user's earphone, and the detected audio signal may include all of external noise, conversations of people around the user, various surrounding sounds, etc.

The audio signal detected by the audio detection unit 130 may be transmitted to the determination unit 140. The determination unit 140 is an element that makes a judgment about the detected audio signal and may make a judgment about at least one of volume, a class, and importance of the audio signal. Specifically, the determination unit 140 may analyze the audio signal detected by the audio detection unit 130 and determine one or more of the class and volume of the audio signal. The determination unit 140 may also determine the importance of the audio signal together. Here, classes are classifications that are designated and set in advance by the user, and the determination unit 140 may classify the audio signal into any one of the classifications preset by the user. Specifically, the classes set by the user may be classified for convenience of the user to include one or more of human voice, a danger warning signal, music sound, living noise, other noise, etc. More specifically, the determination unit 140 may analyze the audio signal using the previously installed artificial intelligence algorithm, and the artificial intelligence algorithm may be trained with the user's manual audio adjustment and make a judgment so that the active audio equipment according to the embodiment of the present invention can automatically adjust audio. It is preferable for the determination unit 140 to make the judgment by analyzing the external audio signal detected by the audio detection unit 130, and the determination unit 140 may determine a location recognized by the location recognition unit 150 together with the audio signal and transmit a comprehensive determination result of the audio signal and the location to the control unit 160.

The location recognition unit 150 is an element that recognizes a location of the output unit 110. Location information recognized by the location recognition unit 150 may be transmitted to the determination unit 140, and the determination unit 140 may determine a type, level, etc. of the audio signal in accordance with the received location information. Specifically, the location recognition unit 150 may recognize whether the user is outdoors or indoors and recognize what kind of place the location of the user is, that is, an office, a classroom, a library, public transportation, a public facility, etc. More specifically, the location recognition unit 150 may recognize the location through Global Positioning System (GPS) coordinates, various distance sensors, etc. and transmit the recognized location information to the determination unit 140, and in the determination unit 140, the artificial intelligence algorithm may make a judgment about the location information in accordance with previously learned results and accurately determine whether the location is indoors or outdoors, what kind of place the location is, etc. Accordingly, the determination unit 140 may determine a class and volume of the externally detected audio signal in consideration of the location information received from the location recognition unit 150. In the above-described embodiment, it has been described that the location of the user is found by making a judgment about the location information of the location recognition unit 150. However, according to another embodiment, even when the location recognition unit 150 is not included, the audio signal detected by the audio detection unit 130 may be tracked, and the artificial intelligence algorithm of the determination unit 140 may detect information related to a place at which an audio signal of the user is detected by analyzing the tracked audio signal so that the place may be found. To be specific, according to the above description, the determination unit 140 may determine a class of a detected audio signal by analyzing the audio signal, and a place may be found on the basis of a result value of the determined class. Specifically, when a class of an audio signal detected by the audio detection unit 130 is classified as vehicle sound or the like by the determination unit 140, it may be recognized that the place of the user is a street, that is, outdoors, and when an audio signal of which a class is classified as public transportation announcement or the like is recognized, it may be recognized that the user is in public transportation. Also, when television (TV) sounds, the sound of boiling water, etc. are recognized, it may be recognized that the user is indoors, and when the precision is increased, it may also be recognized that the user is at home, in an office, etc. In this way, the location may be found as accurate coordinate values by the location recognition unit 150, but the place of the user may be recognized by tracking an audio signal, and the output of audio data may be controlled in accordance with the place.

The determination unit 140 may comprehensively make a judgment about the external audio signal detected by the audio detection unit 130 and the location information recognized by the location recognition unit 150 and transmit a control command in accordance with the judgment result to the control unit 160. The control unit 160 is an element that controls the output of the audio data input from the data input unit 120 on the basis of information determined by the determination unit 140. Specifically, the control unit 160 may adjust audio of the audio data input from the data input unit 120 in accordance with the judgment result of the determination unit 140 and output the adjusted audio data to the output unit 110. In other words, the control unit 160 can adjust audio of the output unit 110 on the basis of the judgment result of the determination unit 140 without the user's manual operation. Here, the adjusted audio may include the volume, echo, etc. of the audio data output by the output unit 110. Specifically, according to the active audio equipment of the present invention, it is possible to automatically turn on or off a noise cancelling function of the output unit 110 in consideration of the place of the user, the class of the external audio signal, input volume, etc., and a user-customized audio adjustment system can be provided by automatically adjusting audio such as volume, echo, etc. Also, a transparent mode may be turned on or off. Specifically, the transparent mode is a function in which the audio detection unit 130 recognizes and outputs an external audio signal to the user's ear through the output unit 110. When an audio signal of which a class is classified as a danger signal or the like that the user should listen to is received in some cases, the audio signal may be output through the output unit 110 so that the user can listen to the important audio signal.

Figure 4:
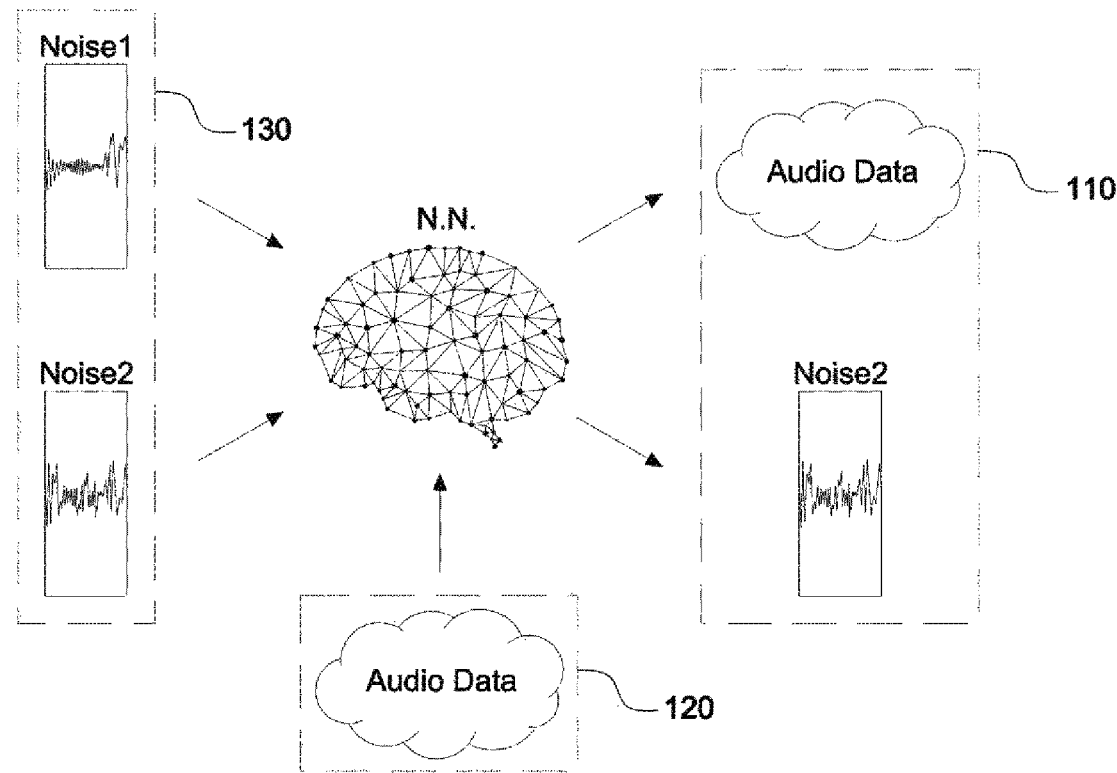
FIG. 4 is a schematic diagram of an audio equipment system according to a first embodiment of the present invention.

A first embodiment and additional modified embodiments of the active audio equipment of the present invention will be described in detail below with reference to FIG. 4. FIG. 4 is a schematic diagram of an audio equipment system according to the first embodiment of the present invention.

Referring to FIG. 4, the determination unit 140 simultaneously analyzes and makes judgments about an audio signal detected by the audio detection unit 130 and audio data input from the data input unit 120 using a previously installed artificial intelligence algorithm and instructs the control unit 160 so that the control unit 160 may control the output of final audio data. To be specific, the artificial intelligence algorithm installed in the determination unit 140 may monitor and record a user's manual operation in accordance with a determination result value of an externally input audio signal. Subsequently, active audio adjustments may be learned on the basis of the recorded manual operation of the user. Specifically, according to an embodiment, when the audio detection unit 130 detects an external audio signal Noise1, the user may manually adjust audio of audio data that is output through the output unit 110 and heard by the user. In this case, an adjustment result of the user may be monitored and recorded so that the artificial intelligence algorithm of the determination unit 140 may be trained. Subsequently, when an external audio signal classified into the same class is detected, control may be performed so that an audio adjustment is actively made to reflect the previous audio adjustment result of the user. The adjusted "audio" is a term including one or more of volume, sound quality, and audio effects, and audio adjustments may include not only a volume adjustment but also an adjustment of turning on or off the noise cancelling function.

According to another embodiment, when an external audio signal detected by the audio detection unit 130 is recognized as two signals Noise1 and Noise2 as shown in FIG. 4, the determination unit 140 makes a judgment about each of the audio signals and determines a type and situation of Noise1 and a type and situation of Noise2. When it is determined that Noise1 is an unnecessary noise signal, Noise1 is blocked and prevented from being output to the output unit 110 through which the user is listening. When Noise2 is a conversational sound for calling the user, a warning sound for providing a notification of a dangerous situation, or the like, Noise2 may be output to the output unit 110 and heard by the user. More specifically, the determination unit 140 may prevent all audio signals that are determined as general external noise from being output to the output unit 110 through noise cancelling. However, when an audio signal is determined as a danger warning sound (a disaster notification, a car horn, etc.), a conversational sound for talking with the user, etc., the determination unit 140 may output the audio signal to the output unit 110 together with audio data. In some cases, conversational sounds may be controlled to be output to the output unit 110 together with input audio data, but when a danger warning sound is recognized, output of audio data is stopped, and only the danger warning sound is output to the output unit 110 so that safety of the user may be prioritized. Also, when audio data, a conversational sound, etc. are simultaneously output, each of output volume, audio, etc. of the audio data and the conversational sound may be automatically adjusted in accordance with results of training based on the user's usual pattern. Also, when the location is determined to be a library or the like by the location recognition unit 150 or through audio signal analysis, the noise cancelling function may be automatically turned on, and when the user is determined to be outdoors, the noise cancelling function may be turned on or off or volume may be adjusted in accordance with the user's usual pattern. Even when the noise cancelling function is turned on, a danger warning sound or the like may be externally detected by the audio detection unit 130. In this case, the noise cancelling function may be immediately turned off, and the danger warning sound may be transmitted to the user. Also, when an externally generated audio signal is detected at a specific volume level or more, the artificial intelligence algorithm of the determination unit 140 may transmit the audio signal to the user. In public transportation or the like, when an announcement of the name of a station where the user regularly moves in accordance with the user's pattern is made, the noise cancelling function may be turned off, and the user may be notified that he or she has arrived at a transfer station or a destination. As described above, when an audio signal classified into an important class in accordance with the user's class settings, such as a warning sound, a specific volume or more, etc., is detected, the noise cancelling function may be simply turned off. However, according to another embodiment, the transparent mode may be turned on so that the user can be accurately and rapidly aware of the important audio signal.

As described above, when active audio equipment of the present invention is used, it is possible to automatically provide user-customized audio without a user performing any manipulation. Also, the user can be informed of a dangerous situation.

The above-described present invention relates to an embodiment, which is merely an embodiment. Those of ordinary skill in the art can make various modifications and other equivalents from the embodiment. The scope of the present invention is not limited to the above-described embodiment and the accompanying drawings.

INDUSTRIAL APPLICABILITY

According to the present invention, it is possible to provide audio equipment capable of turning on or off active audio adjustment or noise cancelling based on an artificial intelligence algorithm by determining a pattern of a user and a type and level of external noise.

Finally, it is possible to control audio or a noise cancelling function without a user's manual operation, and a trained artificial intelligence algorithm can automatically adjust audio in accordance with surroundings or the like.

The invention claimed is:

1. Active audio equipment comprising:
an ear cap at least a portion of which is configured to be inserted into a user's ear;
a data input unit to which audio data is input from an external terminal;
an output unit configured to output the input audio data;
an audio detection unit configured to detect an externally generated audio signal;
a determination unit configured to determine at least one of a class and volume of the audio signal by analyzing the audio signal detected by the audio detection unit; and
a control unit configured to control output of the audio data input from the data input unit on the basis of information determined by the determination unit,
wherein the determination unit analyzes the audio signal using an artificial intelligence algorithm that is pre-loaded into the determination unit, and
wherein the artificial intelligence algorithm monitors and records manual operations of the user in accordance with a result value of the audio signal determined by the determination unit.

2. The active audio equipment of claim 1, wherein the artificial intelligence algorithm learns audio adjustments on the basis of the recorded manual operations of the user.

3. The active audio equipment of claim 2, wherein the determination unit detects information related to a place in which the audio signal is detected on the basis of the determined class of the audio signal.

4. The active audio equipment of claim 3, wherein the control unit adjusts audio of the audio data input from the data input unit in accordance with a determination result of the determination unit and outputs the adjusted audio data.

5. The active audio equipment of claim 3, wherein the class of the audio signal is classified as any one of classifications pre-designated and pre-set by the user.

6. The active audio equipment of claim 2, wherein the control unit adjusts audio of the audio data input from the data input unit in accordance with a determination result of the determination unit and outputs the adjusted audio data.

7. The active audio equipment of claim 6, wherein the artificial intelligence algorithm determines at least one of the class and the volume of the audio signal by analyzing the detected audio signal and learns the audio signal from feedback of the user for the determined result value.

8. The active audio equipment of claim 7, further comprising a location recognition unit configured to recognize a location of the output unit,
wherein location information recognized by the location recognition unit is transmitted to the determination unit, and
the determination unit determines the class and the volume of the audio signal in consideration of the received location information.

9. The active audio equipment of claim 2, wherein the class of the audio signal is classified as any one of classifications pre-designated and pre-set by the user.

10. The active audio equipment of any one of claim 1, wherein the class of the audio signal is classified as any one of classifications pre-designated and pre-set by the user.

* * * * *